(12) United States Patent
Ohsawa et al.

(10) Patent No.: US 7,298,977 B2
(45) Date of Patent: Nov. 20, 2007

(54) OPTICAL TRANSMITTER

(75) Inventors: Katsuichi Ohsawa, Osaka (JP);
Toyoyuki Shimazaki, Osaka (JP);
Tetsuo Chato, Katano (JP); Yuzo Shimizu, Mishima-gun (JP); Kenji Imaizumi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 576 days.

(21) Appl. No.: 10/496,687

(22) PCT Filed: Nov. 28, 2002

(86) PCT No.: PCT/JP02/12464

§ 371 (c)(1),
(2), (4) Date: May 26, 2004

(87) PCT Pub. No.: WO03/049328

PCT Pub. Date: Jun. 12, 2003

(65) Prior Publication Data

US 2005/0063710 A1    Mar. 24, 2005

(30) Foreign Application Priority Data

Dec. 7, 2001 (JP) .............................. 2001-374528

(51) Int. Cl.
*H04B 10/04* (2006.01)
*H04B 10/12* (2006.01)
*G01J 1/32* (2006.01)
*H01S 3/13* (2006.01)

(52) U.S. Cl. .................. 398/182; 398/197; 372/29.014; 372/29.015; 250/205

(58) Field of Classification Search .............. 398/182, 398/197, 196, 193, 192; 372/9, 25, 29.01, 372/29.014, 29.015, 38.02, 38.07; 250/338.1, 250/200, 201.1, 205–206
See application file for complete search history.

(56) References Cited

FOREIGN PATENT DOCUMENTS

| JP | 60264130 | 12/1985 |
| JP | 10013344 | 1/1998 |
| JP | 10-284783 | * 10/1998 |
| JP | 10284783 | 10/1998 |

OTHER PUBLICATIONS

PCT International Search Report dated Mar. 11, 2003.

\* cited by examiner

*Primary Examiner*—M. R. Sedighian
(74) *Attorney, Agent, or Firm*—Stevens, Davis, Miller & Mosher, LLP (57) ABSTRACT

The present invention is intended to prevent a light-emitting diode from emitting light continuously in the case when the level at an input terminal is fixed high because of software or the like and to avoid various problems, such as battery exhaustion and breakdown of the light-emitting diode, in PDAs, cellular phones, etc. For these purposes, a high-pass filter 21 for passing the high-frequency components of an optical transmission input signal having a pulse waveform and a binary circuit 22 for binarizing the output signal of the high-pass filter 21 so as to be returned to a pulse waveform are provided in the preceding stage of a light-emitting device driving circuit 23 for driving a light-emitting diode 8 for optical transmission.

9 Claims, 9 Drawing Sheets

OPTICAL TRANSMITTER

TECHNICAL FIELD

Infrared communication systems are widely used for information communication apparatuses, such as notebook personal computers, cellular phones, PDAs (Personal Digital Assistants).

Such an infrared communication system comprises a light receiving/emitting module and a system LSI for electrically processing data. The light receiving/emitting module has an optical transmitter for optically transmitting data and an optical receiver for optically receiving data in one package.

Although various standards have been proposed for the infrared communication systems, an infrared communication system wherein the IrDA standard is adopted is mainstream in these years.

The present invention relates to an optical transmitter for use in the configuration of the above-mentioned infrared communication system.

BACKGROUND TECHNOLOGY

Figure 7:
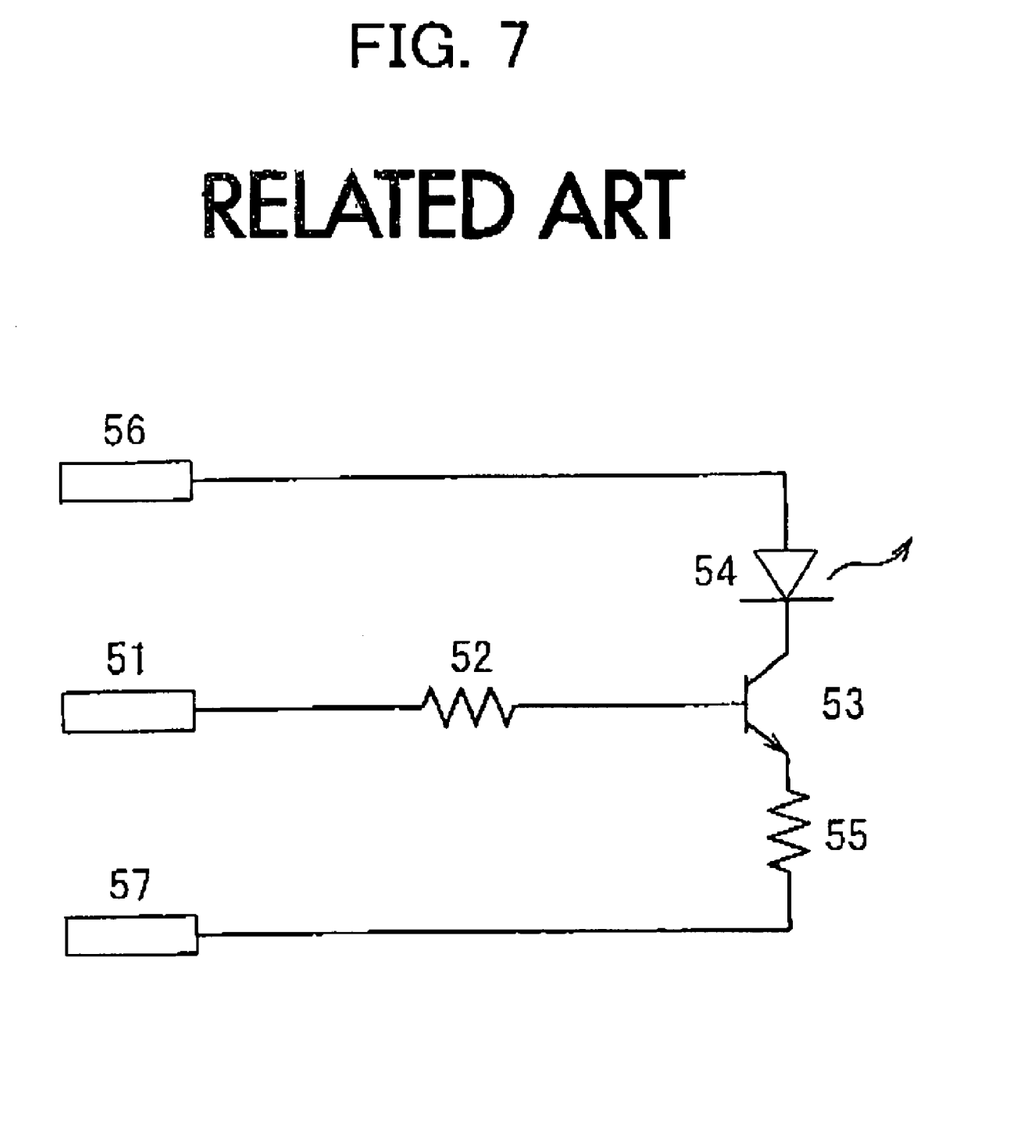
FIG. 7 is a circuit diagram showing the configuration of the conventional optical transmitter.

The above-mentioned conventional optical transmitter has a circuit configuration shown in FIG. 7. In other words, as shown in FIG. 7, an input terminal 51 is connected to one terminal of a resistor 52, and the other terminal of the resistor 52 is connected to the base of an NPN bipolar transistor 53 for driving a light emitting device. The collector of the NPN bipolar transistor 53 is connected to the cathode of a light-emitting diode 54 for optical transmission, and the emitter of the NPN bipolar transistor 53 is connected to one terminal of a resistor 55. The anode of the light-emitting diode 54 is connected to a power supply terminal 56, and the other terminal of the resistor 55 is connected to a ground terminal 57.

In the above-mentioned optical transmitter, when an optical transmission input signal applied to the input terminal 51 becomes high, the NPN bipolar transistor 53 conducts, a current flows from the power supply terminal 56 to the light-emitting diode 54, and the light-emitting diode 54 emits light. In addition, when the optical transmission input signal applied to the input terminal 51 becomes low, the NPN bipolar transistor 53 shuts off, no current flows to the light-emitting diode 54, and the light-emitting diode 54 stops light emission.

Figure 8:
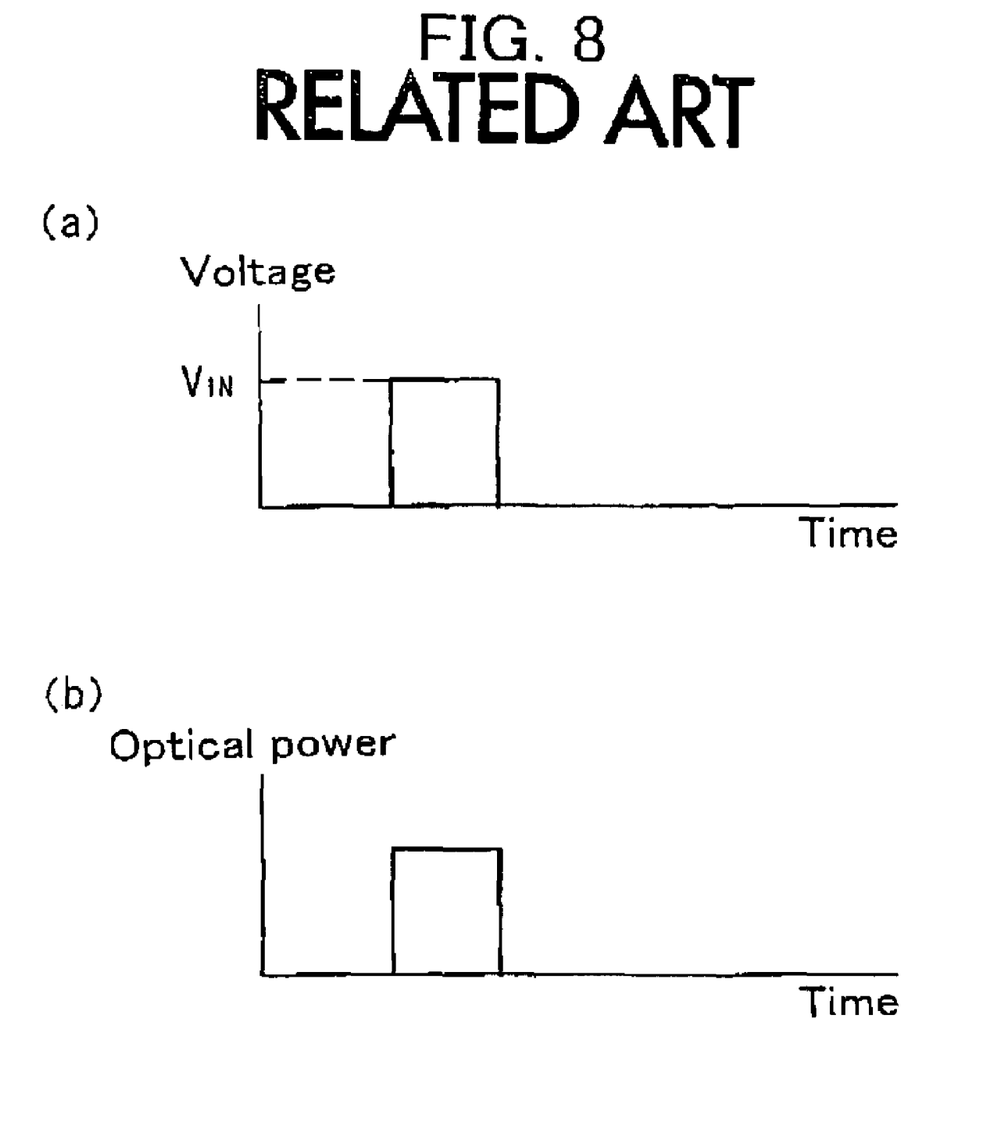
FIG. 8 is a waveform diagram showing the operation of the conventional optical transmitter.

In the case of this circuit configuration, when an optical transmission input signal having an amplitude $V_{IN}$ shown in the waveform (a) of FIG. 8, that is, the output signal from a system LSI, is input to the input terminal 51 of the optical transmitter, the optical output from the light-emitting diode 54 has the same waveform as that of the output signal from the system LSI as shown in the waveform (b) of FIG. 8.

Figure 9:
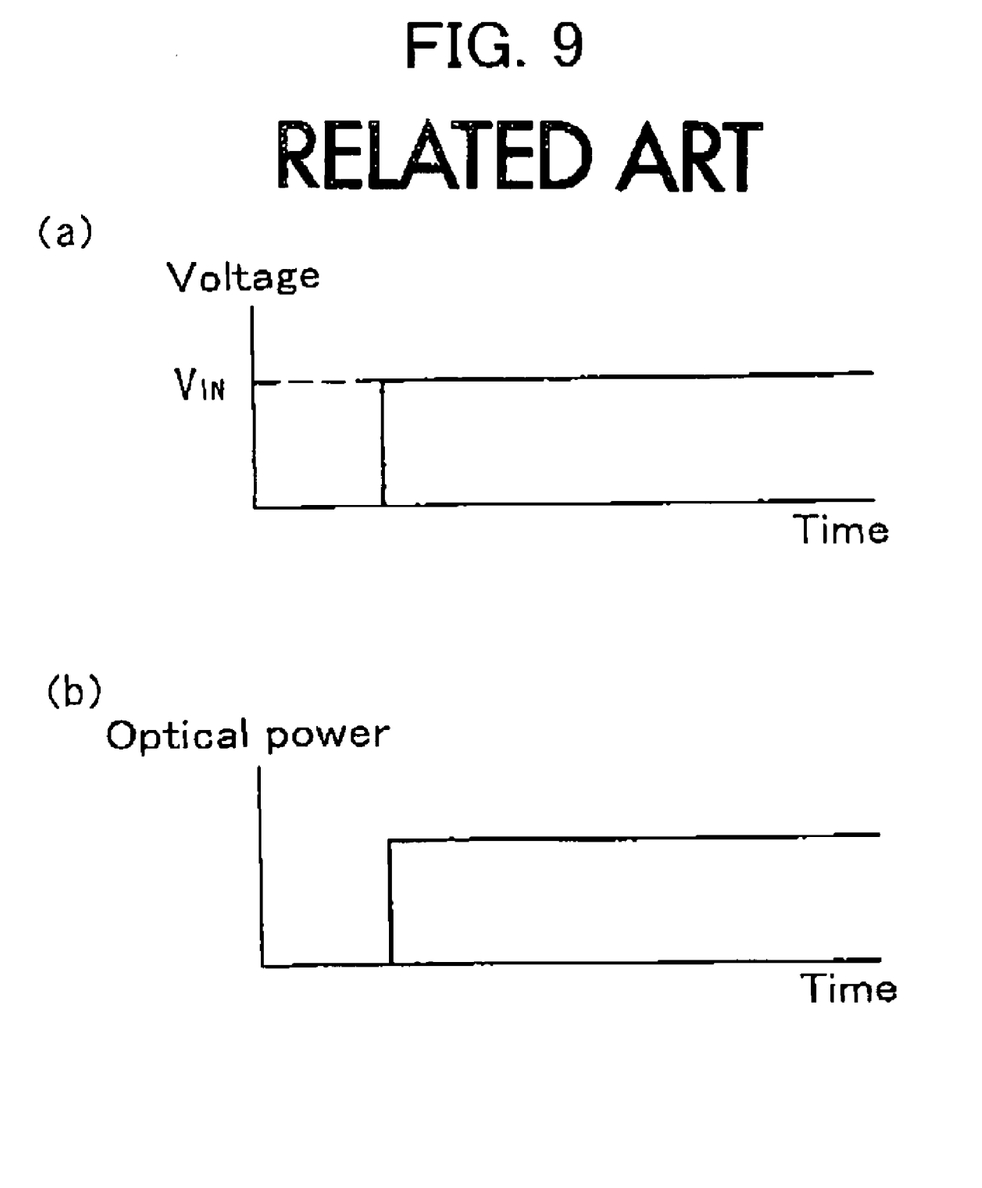
FIG. 9 is a waveform diagram showing the operation of the conventional optical transmitter.

However, in the case when the potential of the input terminal 51, that is, the optical transmission input signal, is fixed high as shown in the waveform (a) of FIG. 9 because of the software or the like of the system LSI, the NPN bipolar transistor 53 maintains conducting. As a result, the light-emitting diode 54 emits light continuously as shown in the waveform (b) of FIG. 9.

Hence, it has been pointed out that various problems, such as battery exhaustion and breakdown of the light-emitting diode 54, may occur in PDAs and cellular phones.

For the prevention of the above-mentioned problems, a countermeasure is taken by disposing a protection circuit in the preceding stage of the input terminal 51 of the optical transmitter in many cases.

This protection circuit is configured to measure the pulse width of the optical transmission input signal by using a timer or the like and to forcibly stop the optical transmission input signal when the pulse width exceeds a certain time width.

In the conventional circuit configuration shown in FIG. 7, as described above, in the case when the potential of the input terminal 51, that is, the optical transmission input signal, is fixed high because of the software or the like, the light-emitting diode 54 emits light continuously. As a result, various problems, such as battery exhaustion and breakdown of the light-emitting diode 54, are caused in PDAs and cellular phones.

Furthermore, the configuration wherein the protection circuit is disposed in the preceding stage of the input terminal 51 of the optical transmitter is complicated, thereby causing a problem of high cost.

DISCLOSURE OF INVENTION

The present invention is intended to provide an optical transmitter capable of automatically stopping the light-emitting operation of a light-emitting device when the pulse width of an optical transmission input signal exceeds a predetermined value owing to a malfunction, such as the case when the optical transmission input signal is fixed high, capable of preventing battery exhaustion and breakdown of the light-emitting device due to the malfunction, and capable of attaining a configuration for the purposes simply at low cost.

The optical transmitter in accordance with the present invention comprises a high-pass filter for passing the high-frequency components of an optical transmission input signal having a pulse waveform, a binary circuit for binarizing the output signal of the high-pass filter so as to be returned to a pulse waveform, a light-emitting device for optical transmission, and a light-emitting device driving circuit for driving the light-emitting device depending on the output signal of the binary circuit.

With this configuration, the optical transmission input signal having a pulse waveform is not directly input to the light-emitting device driving circuit; instead, the signal is once passed through the high-pass filter so that the pulse waveform is differentiated, the differentiated signal is binarized by the binary circuit so as to be returned to a pulse waveform, and then the signal is input to the light-emitting device driving circuit. Hence, the optical transmission input signal having a pulse width shorter than the predetermined time width determined by the time constant of the high-pass filter and the binarization threshold value of the binary circuit is output from the binary circuit while its pulse width is unchanged.

However, with respect to the optical transmission input signal having a pulse width longer than the above-mentioned predetermined time width, when the signal is passed through the high-pass filter, its level lowers gradually; when the predetermined time passes, the level of the output signal of the high-pass filter becomes lower than the binarization threshold value of the binary circuit. As a result, even if the optical transmission input signal having a pulse width longer than the above-mentioned predetermined time width is input, a signal having a pulse width longer than the predetermined time width is not output from the binary circuit.

Hence, in the case when the optical transmission input signal is fixed high because of software or the like, or in the case when the pulse width of the optical transmission input signal becomes longer than a pulse width assumed in an applicable communication system, the light-emitting diode emits light only during the period of time of the predetermined pulse width but does not emit light during the period of time longer than that.

Therefore, it is possible to prevent battery exhaustion of the battery for supplying electricity to the optical transmitter and to prevent breakdown of the light-emitting diode.

In addition, as the configuration for the above-mentioned purpose, the high-pass filter and the binary circuit should only be provided, and the circuit constant of the high-pass filter should only be set properly depending on the time width of the optical transmission signal to be shuts off, whereby the configuration is simple and can be attained at low cost.

In the above-mentioned optical transmitter in accordance with the present invention, the high-pass filter comprises an L-type circuit including a capacitor and a resistor, for example.

With this configuration, since the high-pass filter comprises the capacitor and the resistor, the configuration is simple and can be attained at low cost.

In the above-mentioned optical transmitter in accordance with the present invention, the binary circuit comprises two-stage inverters connected in series, for example.

With this configuration, since the binary circuit comprises the two-stage inverters connected in series, the configuration is simple and can be attained at low cost.

In the above-mentioned optical transmitter in accordance with the present invention, the inverters are formed of CMOS inverters, for example.

With this configuration, since the inverters are formed of CMOS inverters, no standby current is required, and the power consumption can be made lower than that of the configuration wherein the inverters are formed of bipolar transistors.

In the above-mentioned optical transmitter in accordance with the present invention, the light-emitting device driving circuit comprises a bipolar transistor, for example. The output signal of the binary circuit is input to the base of the bipolar transistor, and the bipolar transistor interrupts the current supplied to the light-emitting device depending on the output signal of the binary circuit.

In the above-mentioned optical transmitter in accordance with the present invention, the light-emitting device driving circuit comprises a Darlington circuit including two-stage bipolar transistors connected in series, for example. The output signal of the binary circuit is input to the base of the first-stage bipolar transistor of the Darlington circuit, and the next-stage bipolar transistor of the Darlington circuit interrupts the current supplied to the light-emitting device depending on the output signal of the binary circuit.

With this configuration, the output signal of the binary circuit is applied to the base of the first-stage bipolar transistor, instead of the base of the next-stage bipolar transistor that directly drives the light-emitting diode, whereby, as the binary circuit, a circuit having low current drive capability can be used.

Furthermore, the output signal of the binary circuit is applied between the two base-emitter junctions, being connected in series, of the first-stage and next-stage bipolar transistors constituting the Darlington circuit. In other words, the output signal is applied between the base of the first-stage bipolar transistor and the emitter of the next-stage bipolar transistor. As a result, when noise is generated at the output of the binary circuit, if the level of the noise is not higher than that in the case when the light-emitting device driving circuit comprises a one-stage bipolar transistor, the light-emitting device does not emit light. Hence, noise immunity can be improved.

In the above-mentioned optical transmitter in accordance with the present invention, the light-emitting device driving circuit comprises a MOS transistor, for example. The output signal of the binary circuit is input to the gate of the MOS transistor, and the MOS transistor interrupts the current supplied to the light-emitting device depending on the output signal of the binary circuit.

With this configuration, since the drain-source voltage of the MOS transistor, which determines the lower limit of the operating voltage, is lower than the collector-emitter voltage of the bipolar transistor, low-voltage operation is possible.

In the above-mentioned optical transmitter in accordance with the present invention, the light-emitting device is formed of a light-emitting diode, for example.

BEST MODE FOR CARRYING OUT THE INVENTION

Figure 1:
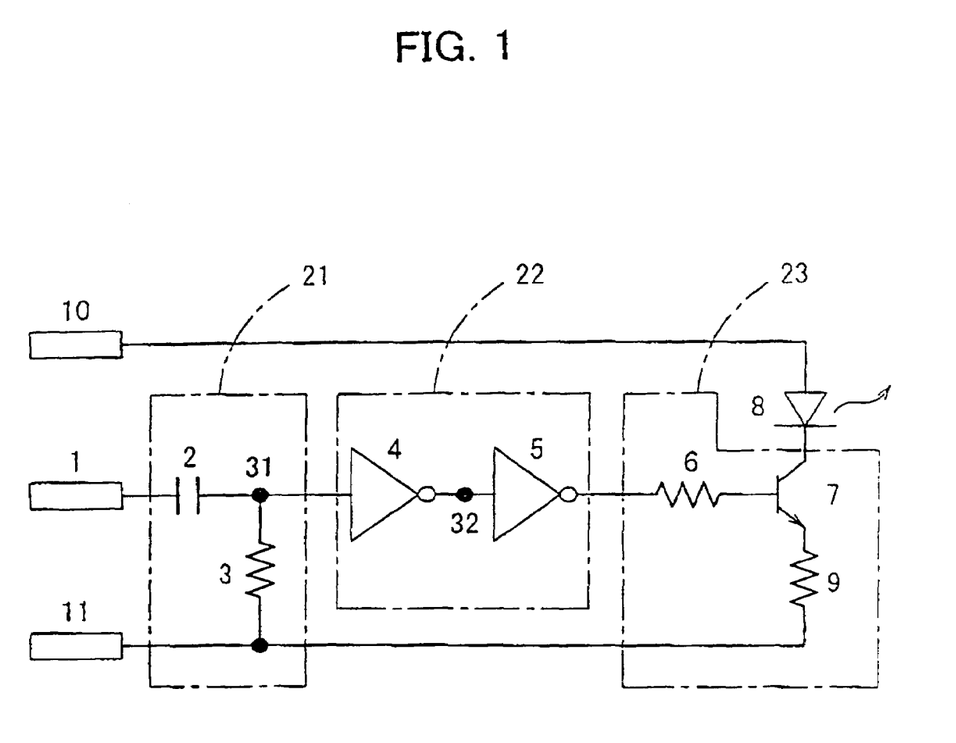
FIG. 1 is a circuit diagram showing the configuration of an optical transmitter in accordance with a first embodiment of the present invention.

FIG. 1 is a circuit diagram showing the configuration of an optical transmitter in accordance with a first embodiment of the present invention. As shown in FIG. 1, this optical transmitter comprises a high-pass filter 21 for passing the high-frequency components of an optical transmission input signal having a rectangular pulse waveform, a binary circuit 22 for binarizing the output signal of the high-pass filter 21 so as to be returned to a pulse waveform, a light-emitting diode 8 serving as a light-emitting device f or optical transmission, and a light-emitting device driving circuit 23 for driving the light-emitting diode 8 depending on the output signal of the binary circuit 22.

The high-pass filter 21 comprises an L-type circuit including a capacitor 2 and a resistor 3, for example.

The binary circuit 22 comprises two-stage inverters 4 and 5 connected in series, for example. The inverters 4 and 5 are each formed of a bipolar transistor, for example.

The light-emitting device driving circuit 23 comprises an NPN bipolar transistor 7 and resistors 6 and 7. The NPN bipolar transistor 7 interrupts the current supplied to the light-emitting diode 8 depending on the output signal of the binary circuit 22, which is input to its base. The resistor 6 is inserted between the base of the NPN bipolar transistor 7 and the binary circuit 22. The resistor 9 is inserted between the emitter of the NPN bipolar transistor 7 and a ground terminal 11.

The connection relationship among the devices of the optical transmitter will be described below specifically. One terminal of the capacitor 2 is connected to an input terminal 1, one terminal of the resistor 3 and the input terminal of the inverter 4 are connected to the other terminal of the capacitor 2, and the input terminal of the inverter 5 is connected to the output terminal of the inverter 4. One terminal of the resistor 6 is connected to the output terminal of the inverter 5, and the other terminal of the resistor 6 is connected to the base of the NPN bipolar transistor 7. The cathode of the light-emitting diode 8 is connected to the collector of the NPN bipolar transistor 7, and the anode of the light-emitting diode 8 is connected to a power supply terminal 10. One terminal of the resistor 9 is connected to the emitter of the NPN bipolar transistor 7, and the other terminal of the resistor 3 and the other terminal of the resistor 9 are connected to the ground terminal 11.

For explanation of this embodiment, the node wherein the capacitor 2, the resistor 3 and the input terminal of the inverter 4 are connected is designated by numeral 31, and the node wherein the output terminal of the inventor 4 and the input terminal of the inverter 5 are connected is designated by numeral 32.

Figure 2:
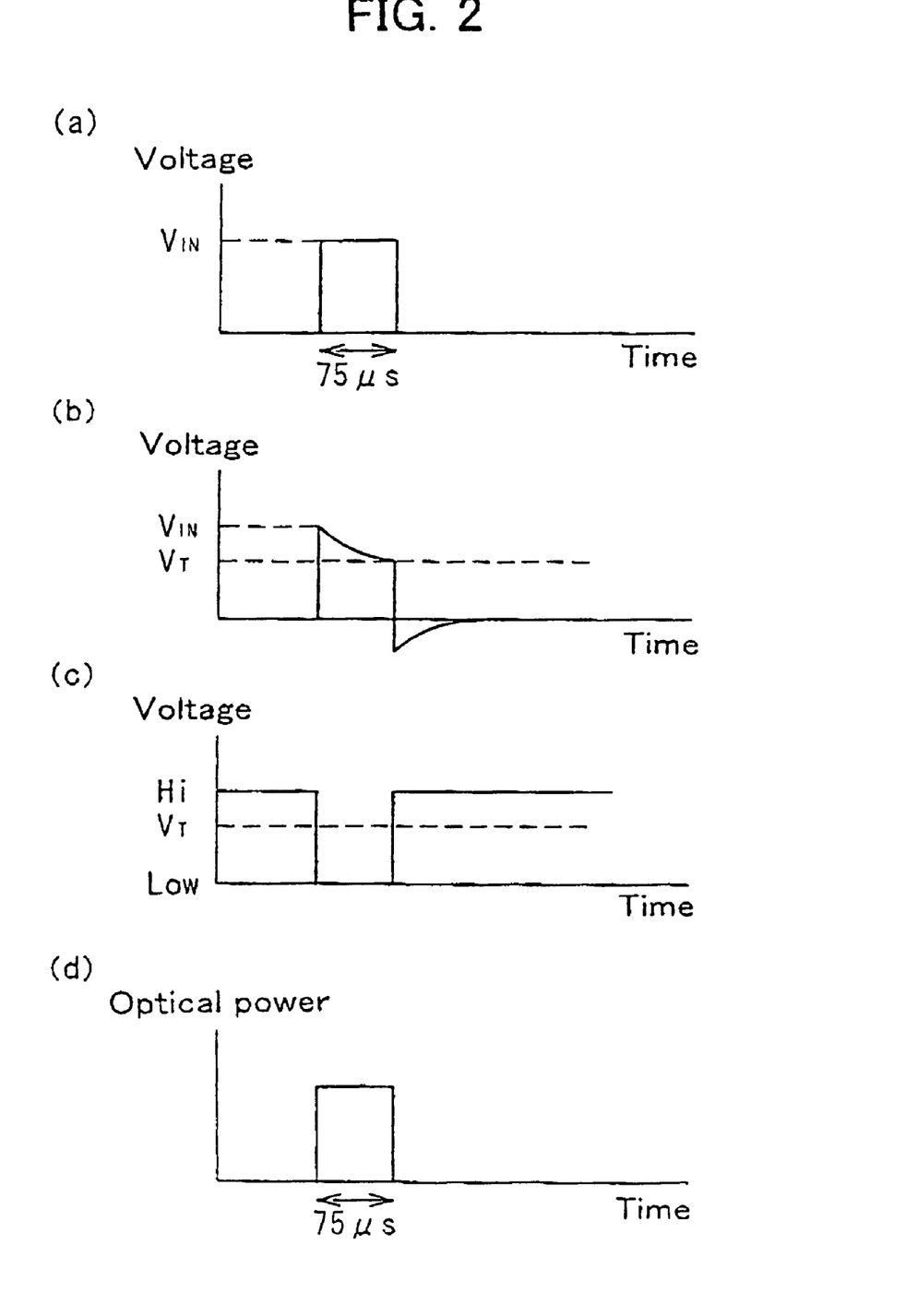
FIG. 2 is a waveform diagram showing the operation of the optical transmitter in accordance with the first embodiment of the present invention.

The waveform (a) of FIG. 2 shows the waveform at the input terminal 1 at the time when a pulse waveform having a pulse width of 75 μ sec, for example, is input as the optical transmission signal to the input terminal 1. Similarly, the waveform (b) of FIG. 2 shows the waveform at the node 31. Similarly, the waveform (c) of FIG. 2 shows the waveform at the node 32. Similarly, the waveform (d) of FIG. 2 shows the optical power of the light-emitting diode 8.

Figure 3:
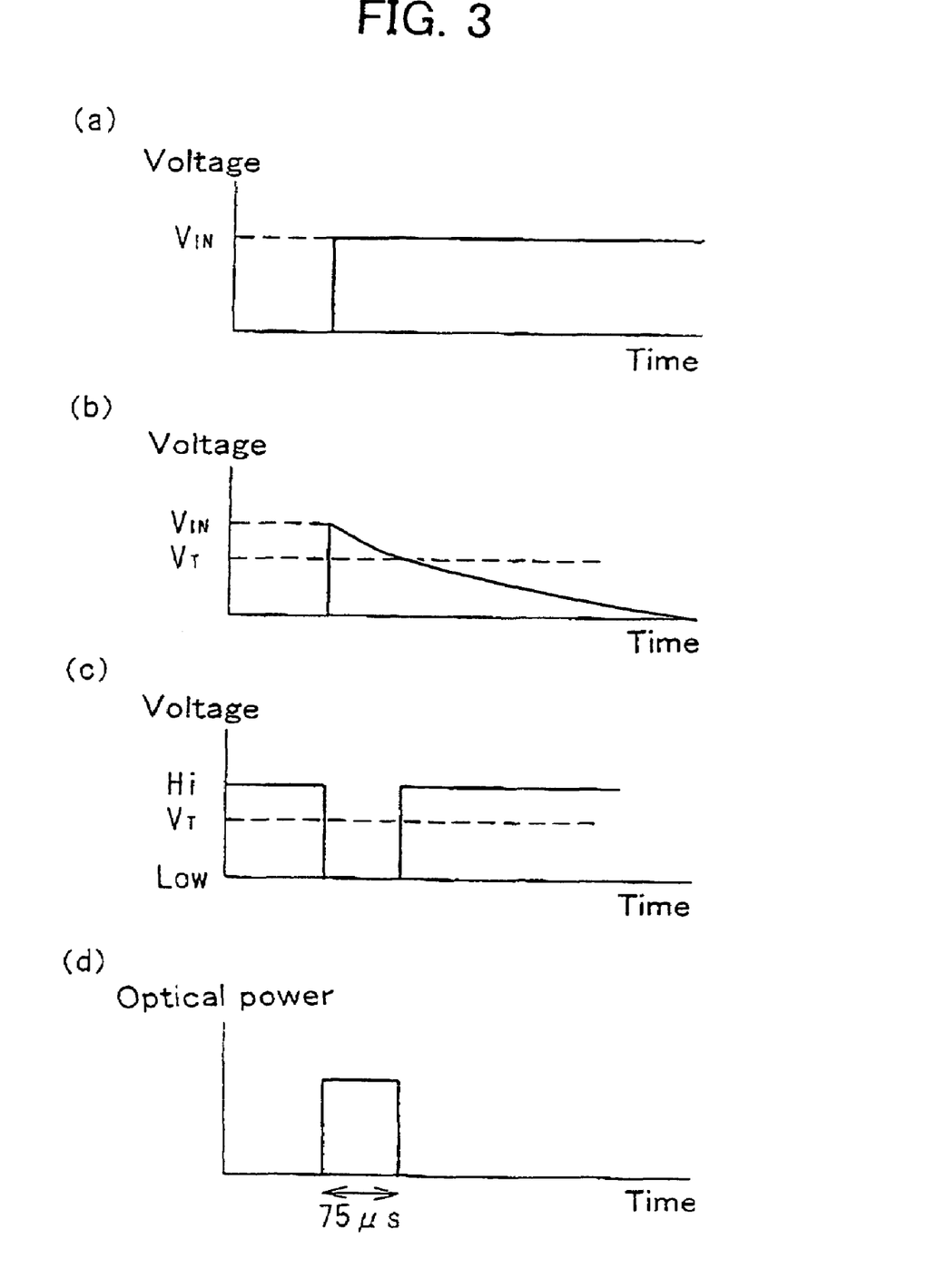
FIG. 3 is a waveform diagram showing the operation of the optical transmitter in accordance with the first embodiment of the present invention.

The waveform (a) of FIG. 3 shows the waveform at the input terminal 1 at the time when a pulse waveform having a pulse width of more than 75 μ sec, for example, is input as the optical transmission signal. Similarly, the waveform (b) of FIG. 3 shows the waveform at the node 31. Similarly, the waveform (c) of FIG. 3 shows the waveform at the node 32. Similarly, the waveform (d) of FIG. 3 shows the optical power of the light-emitting diode 8.

In FIGS. 2 and 3, $V_{IN}$ is the amplitude of the optical transmission signal, and $V_T$, is a threshold value at which the first-stage inverter 4 of the binary circuit 22 distinguishes between high and low levels.

When the optical transmission input signal shown in the waveform (a) of FIG. 2 is input to the input terminal 1, voltage $V_{31}$ shown in the waveform (b) of FIG. 2 is output at the node 31. The optical transmission input signal shown in the waveform (a) of FIG. 2 is a rectangular waveform signal having amplitude $V_{IN}$, cycle T and duty 3/16. In addition, the voltage $V_{31}$ shown in the waveform (b) of FIG. 2 is represented by the following equation (1):

$$V_{31} = V_{IN} * \exp\{-t/(C_2 * R_3)\} \quad \text{Equation (1)}$$

wherein $C_2$ designates the capacitance value of the capacitor 2, and $R_3$ designates the resistance value of the resistor 3.

According to Equation (1), the voltage $V_{31}$ at the node 31 decreases gradually at an attenuation rate of time constant $C_2 * R_3$.

At this time, the capacitance value $C_2$ of the capacitor 2 and the resistance value $R_3$ of the resistor 3 are determined so that the voltage $V_{31}$ at the node 31 does not become lower than the threshold value $V_T$ until the input signal having a predetermined pulse width returns to the low level.

For example, since the longest pulse in the IrDA standard is 75 μ sec (in the case of 2.4 kbps and duty 3/16), the capacitance value $C_2$ of the capacitor 2 and the resistance value $R_3$ of the resistor 3 are determined so as to satisfy the following equation (2):

$$t = C_2 * R_3 * \ln(V_{IN}/V_T) \geq 75\mu \text{ sec} \quad \text{Equation (2)}$$

In the case when it is assumed herein that the power supply voltage $V_{IN}$ is 3.0 V and the threshold value $V_T$ is 1.4 V, and when it is assumed that, for example, $$C_2 = 100 \text{ pF and } R_3 = 1 \text{ M}\Omega$$

Equation (2) can be satisfied.

Hence, the waveform (c) of FIG. 2, the inversion of the optical transmission input signal, is output at the node 32. Therefore, the light-emitting diode 8 emits light during the period of the same pulse width as that of the optical transmission input signal to be input, as shown in the waveform (d) of FIG. 2. When the pulse width of the optical transmission input signal is shorter than 75 μsec, the light-emitting diode 8 emits light during the same time as that of the pulse width.

Next, when the optical transmission input signal having a pulse width of 75 μ sec or more is input as shown in the waveform (a) of FIG. 3 because of the malfunction of the preceding-stage circuit (system LSI), the voltage $V_{31}$ at the node 31 becomes lower than the threshold value $V_T$ at the time when 75 μsec has passed after the rising, as shown in the waveform (b) of FIG. 3. Hence, the voltage at the node 32 returns to the high level at the time when 75 μ sec has passed after the rising of the optical transmission input signal, regardless of the pulse width of the optical transmission input signal. Therefore, the light-emitting diode 8 emits light only 75 μ sec at the longest, no matter how the pulse width of the optical transmission input signal is long.

As described above, the circuit system wherein the optical transmission input signal having a pulse width of 75 μ sec or more is not transmitted to the light-emitting diode 8 is obtained.

With this configuration, the optical transmission input signal having a pulse waveform is not directly input to the light-emitting device driving circuit 23; instead, the signal is once passed through the high-pass filter 21 so that the pulse waveform is differentiated, the differentiated signal is binarized by the binary circuit 22 so as to be returned to a pulse waveform, and then the signal is input to the light-emitting device driving circuit 23. Hence, the optical transmission input signal having a pulse width shorter than the predetermined time width determined by the time constant of the high-pass filter 21 and the binarization threshold value of the binary circuit 22 is output from the binary circuit 22 while its pulse width is unchanged.

However, with respect to the optical transmission input signal having a pulse width longer than the above-mentioned predetermined time width, when the signal is passed through the high-pass filter 21, its level lowers gradually; when the predetermined time passes, the level of the output signal of the high-pass filter 21 becomes lower than the binarization threshold value of the binary circuit 22. As a result, even if the optical transmission input signal having a pulse width longer than the above-mentioned predetermined time width is input, a signal having a pulse width longer than the predetermined time width is not output from the binary circuit 22.

Hence, in the case when the optical transmission input signal is fixed high because of software or the like, the light-emitting diode 8 emits light only during the period of time of the predetermined pulse width but does not emit light during the period of time longer than that.

Therefore, various problems being caused when the level at the input terminal is fixed high or when the pulse width becomes longer than an assumed pulse width because of software or the like can be solved; for example, it is possible to prevent battery exhaustion of the battery for supplying electricity to the optical transmitter and to prevent breakdown of the light-emitting diode 8.

In addition, as the configuration for the above-mentioned purpose, the high-pass filter 21 and the binary circuit 22 should only be provided, and the circuit constant of the high-pass filter 21 should only be set properly depending on the time width of the optical transmission signal to be shuts off, whereby the configuration is simple and can be attained at low cost.

Furthermore, since the high-pass filter 21 comprises the capacitor 2 and the resistor 3, the configuration is simple and can be attained at low cost.

Still further, since the binary circuit 22 comprises the two-stage inverters 4 and 5 connected in series, the configuration is simple and can be attained at low cost.

Second Embodiment

Figure 4:
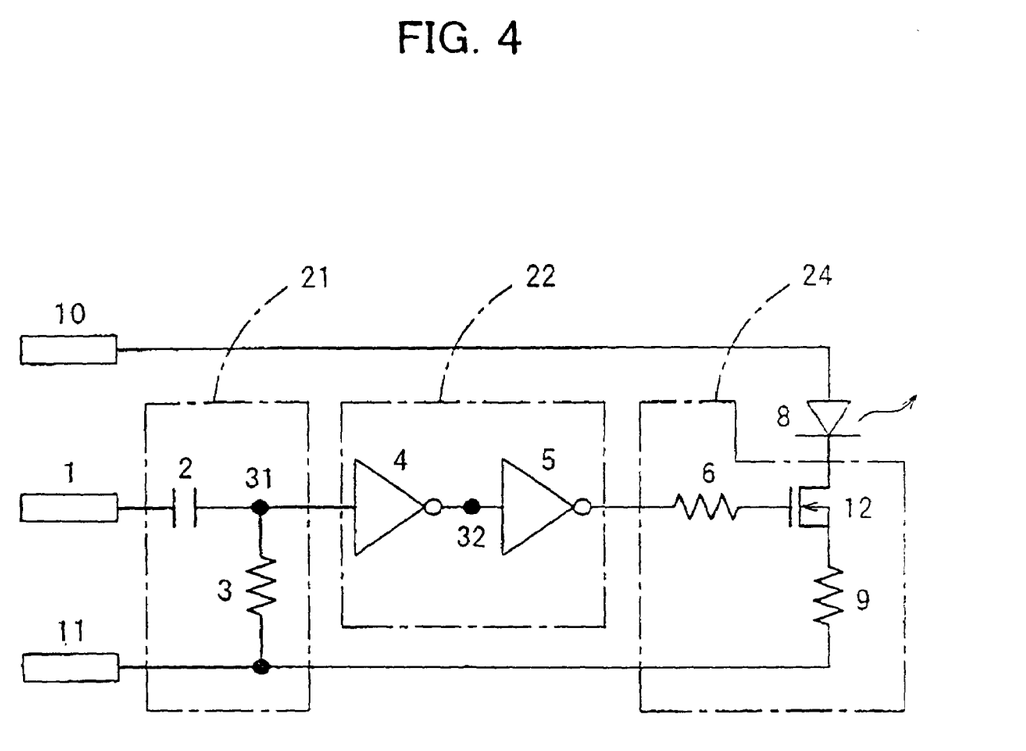
FIG. 4 is a circuit diagram showing the configuration of an optical transmitter in accordance with a second embodiment of the present invention.

FIG. 4 is a circuit diagram showing the configuration of an optical transmitter in accordance with a second embodiment of the present invention. As shown in FIG. 4, in this optical transmitter, the configuration of a light-emitting device driving circuit 24 differs from that of the light-emitting device driving circuit 23 shown in FIG. 1. In other words, in this light-emitting device driving circuit 24, an N-channel MOS transistor 12 is used instead of the NPN bipolar transistor 7. The other configurations are similar to those of the optical transmitter shown in FIG. 1.

In the circuit diagram of FIG. 1, the operating voltage of the optical transmitter is determined by the forward voltage of the light-emitting diode 8, the terminal voltage of the resistor 9 and the collector-emitter voltage of the NPN bipolar transistor 7.

Since the operating current of the light-emitting diode 8 is determined by light emission power, it is assumed herein that the current is constant. Hence, the forward voltage of the light-emitting diode 8 and the terminal voltage of the resistor 9 become constant, whereby the lower limit of the operating voltage is determined by the collector-emitter voltage of the NPN bipolar transistor 7. Generally, the collector-emitter voltage of the NPN bipolar transistor 7 is about 200 mV at the time of saturation.

On the other hand, in the case of the circuit diagram of FIG. 4, the lower limit of the operating voltage is determined by the drain-source voltage of the N-channel MOS transistor 12 at the time of operation. This value, 10 mV, is lower than the collector-emitter voltage of the NPN bipolar transistor 7. Hence, the circuit shown in FIG. 4 can operate on a voltage lower than that of the circuit shown in FIG. 1. The effects other than that described above are similar to those of the first embodiment.

As described above, with the configuration of this embodiment, since the drain-source voltage of the N-channel MOS transistor 12, which determines the lower limit of the operating voltage, is lower than the collector-emitter voltage of the bipolar transistor, low-voltage operation is possible.

Third Embodiment

Figure 5:
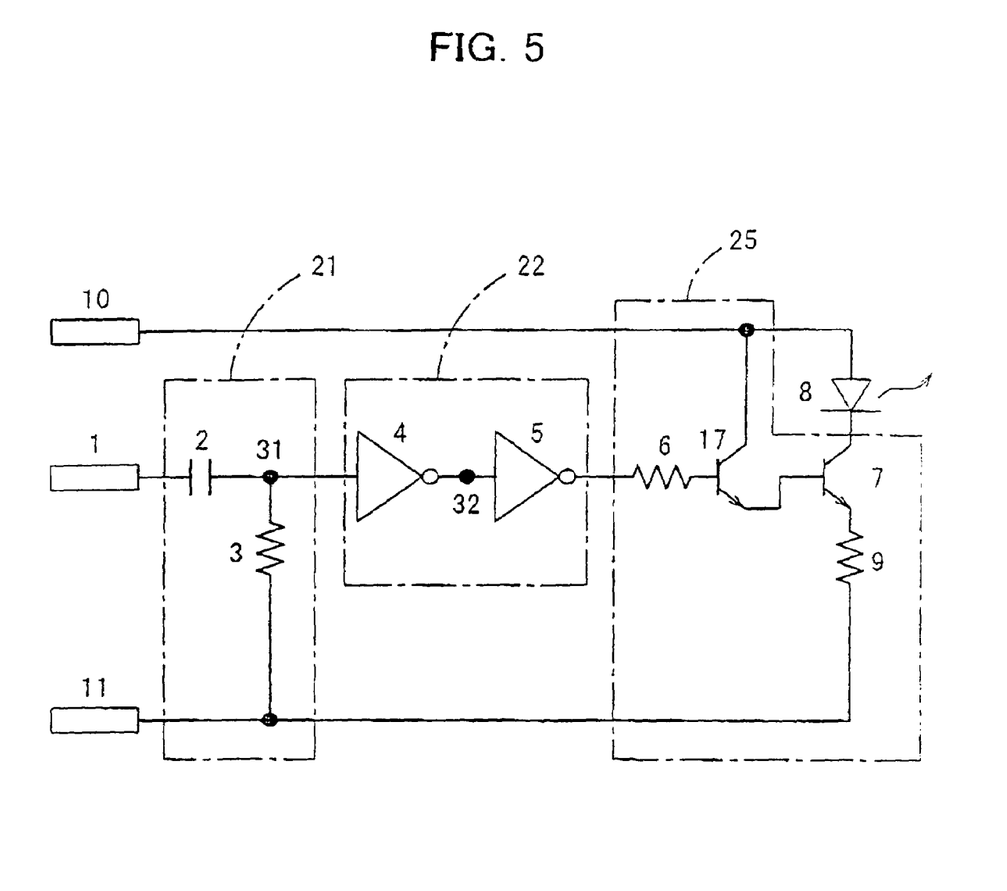
FIG. 5 is a circuit diagram showing the configuration of an optical transmitter in accordance with a third embodiment of the present invention.

FIG. 5 is a circuit diagram showing the configuration of an optical transmitter in accordance with a third embodiment of the present invention. As shown in FIG. 5, in this optical transmitter, the configuration of a light-emitting device driving circuit 25 differs from that of the light-emitting device driving circuit 23 shown in FIG. 1. In other words, in this light-emitting device driving circuit 25, instead of the one-stage NPN bipolar transistor 7, a Darlington circuit having a twostage configuration wherein NPN bipolar transistors 17 and 7 are connected in series is used. In this light-emitting device driving circuit 25, depending on the output signal of the binary circuit 22, input to the base of the first-stage NPN bipolar transistor 17, the next-stage NPN bipolar transistor 7 interrupts the current supplied to the light-emitting diode 8.

More specifically, the base of the first-stage NPN bipolar transistor 17 is connected to the other terminal of the resistor 6, and the collector of the NPN bipolar transistor 17 is connected to the power supply terminal 10, and the emitter of the NPN bipolar transistor 17 is connected to the base of the NPN bipolar transistor 7. The other configurations are similar to those of the optical transmitter shown in FIG. 1.

In the circuit configuration shown in FIG. 1, in the case when noise is generated at the output of the inverter 5 constituting the binary circuit 22 of the preceding stage, if the level of the noise becomes 0.3 V or more, the transistor 7 gradually starts operating, and the light-emitting diode 8 gradually starts light emission.

However, in the circuit configuration shown in FIG. 5, even in the case when noise is generated at the output of the inverter 5, since the NPN bipolar transistor 17 is inserted in the preceding stage of the NPN bipolar transistor 7 in the form of the Darlington connection, the NPN bipolar transistors 17 and 7 do not gradually start operation unless the level of the noise becomes 1.0 V or more.

In the configuration of this embodiment, the output signal of the binary circuit 22 is applied to the base of the first-stage NPN bipolar transistor 17, instead of the base of the next-stage NPN bipolar transistor 7 that directly drives the light-emitting diode 8. As a result, inverters having low current drive capability can be used as the inverters 4 and 5 constituting the binary circuit 22.

Furthermore, the output signal of the binary circuit 22 is applied between the two base-emitter junctions, being connected in series, of the first-stage and next-stage NPN bipolar transistors 17 and 7 constituting the Darlington circuit. In other words, the output signal of the binary circuit 22 is applied between the base of the first-stage NPN bipolar transistor 17 and the emitter of the next-stage NPN bipolar transistor 7. As a result, when noise is generated at the output of the binary circuit 22, if the level of the noise is not higher than that in the case when the light-emitting device driving circuit 25 comprises only the one-stage NPN bipolar transistor 7, the light-emitting diode 8 does not emit light. Hence, noise immunity can be improved.

The other effects are similar to those of the first embodiment.

Fourth Embodiment

Figure 6:
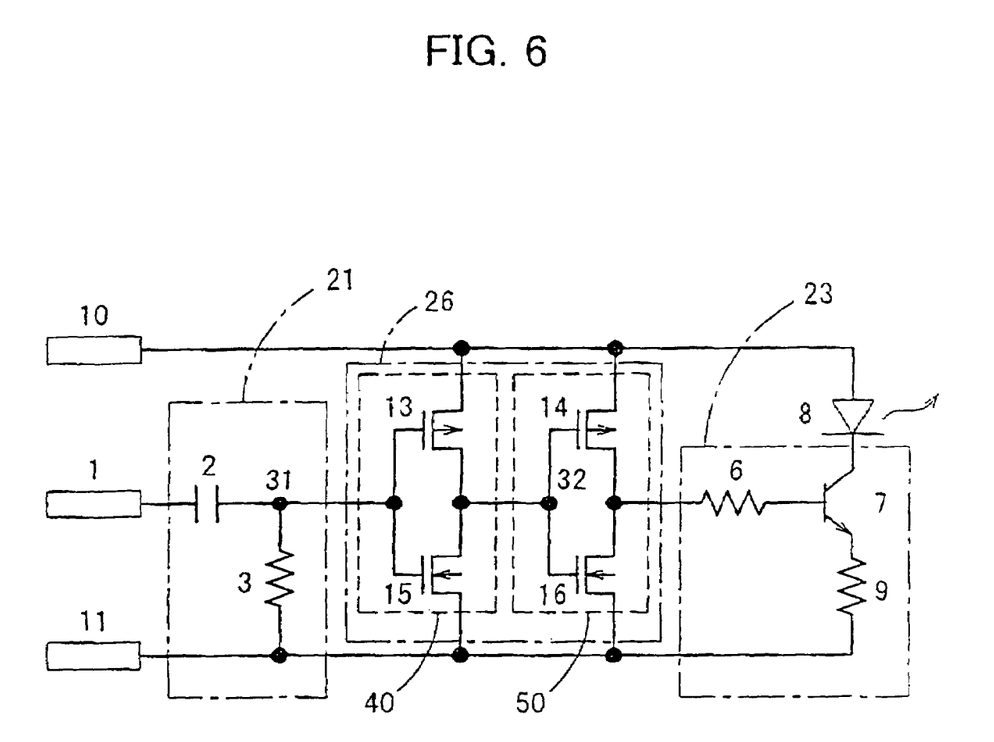
FIG. 6 is a circuit diagram showing the configuration of an optical transmitter in accordance with a fourth embodiment of the present invention.

FIG. 6 is a circuit diagram showing the configuration of an optical transmitter in accordance with a fourth embodiment of the present invention. In this optical transmitter, the configuration of a binary circuit 26 differs from that shown in FIG. 1. In other words, CMOS inverters 40 and 50 are used instead of the inverters 4 and 5 formed of bipolar transistors. Furthermore, CMOS inverters can also be applied to the circuits shown in FIGS. 4 and 5.

The inverters 40 and 50 have a circuit configuration described below. In other words, the gate of the P-channel MOS transistor 13 and the gate of the N-channel MOS transistor 15 are connected to the resistor 3 and the capacitor 2. In addition, the drain of the P-channel MOS transistor 13 and the drain of the N-channel MOS transistor 15 are connected to the gate of the P-channel MOS transistor 14 and the gate of the N-channel MOS transistor 16. Furthermore, the drain of the P-channel MOS transistor 14 and the drain of the N-channel MOS transistor 16 are connected to the resistor 6. Moreover, the sources of the P-channel MOS transistors 13 and 14 are connected to the power supply terminal 10. Still further, the sources of the N-channel MOS transistors 15 and 16 are connected to the ground terminal 11.

With this embodiment, the inverters 40 and 50 are formed of CMOS inverters, whereby no standby current is required. Hence, the power consumption can be made lower than that of the first embodiment wherein the inverters 4 and 5 formed of bipolar transistors are used. The other effects are similar to those of the first embodiment.

In the above-mentioned embodiments, an NPN bipolar transistor or an N-channel MOS transistor is used for the light-emitting device driving circuit; however, instead of these, a PNP bipolar transistor or a P-channel MOS transistor can also be used to form the light-emitting device driving circuit.

The invention claimed is:

1. An optical transmitter comprising:
  a high-pass filter for passing the high-frequency components of an optical transmission input signal having a pulse waveform,
  a binary circuit for binarizing the output signal of said high-pass filter so as to be returned to a pulse waveform,
  a light-emitting device for optical transmission, and
  a light-emitting device driving circuit for driving said light-emitting device depending on the output signal of said binary circuit, wherein:
  when said optical transmission input signal has a pulse width shorter than a predetermined time period determined by a time constant of said high-pass filter and a binarization threshold value of said binary circuit, said binary circuit provides an output signal having a pulse width which is unchanged from said pulse width of said optical transmission input signal, and
  when said optical transmission input signal has a pulse width longer than said predetermined time width, said binary circuit provides an output signal having a pulse width of said predetermined time period.

2. An optical transmitter in accordance with claim 1, wherein said high-pass filter comprises an L-type circuit including a capacitor and a resistor.

3. An optical transmitter in accordance with claim 1, wherein said binary circuit comprises two-stage inverters connected in series.

4. An optical transmitter in accordance with claim 3, wherein said inverters are formed of CMOS inverters.

5. An optical transmitter in accordance with claim 1, wherein said light-emitting device driving circuit comprises a bipolar transistor, the output signal of said binary circuit is input to the base of said bipolar transistor, and said bipolar transistor interrupts the current supplied to said light-emitting device depending on the output signal of said binary circuit.

6. An optical transmitter comprising:
  a high-pass filter for passing the high-frequency components of an optical transmission input signal having a pulse waveform,
  a binary circuit for binarizing the output signal of said high-pass filter so as to be returned to a pulse waveform,
  a light-emitting device for optical transmission, and
  a light-emitting device driving circuit for driving said light-emitting device depending on the output signal of said binary circuit, wherein:
  said light-emitting device driving circuit comprises a Darlington circuit comprising two-stage bipolar transistors connected in series,
  the output signal of said binary circuit is input to the base of the first-stage bipolar transistor of said Darlington circuit, and
  the next-stage bipolar transistor of said Darlington circuit interrupts the current supplied to said light-emitting device depending on the output signal of said binary circuit.

7. An optical transmitter in accordance with claim 1, wherein said light-emitting device driving circuit comprises a MOS transistor, the output signal of said binary circuit is input to the gate of said MOS transistor, and said MOS transistor interrupts the current supplied to said light-emitting device depending on the output signal of said binary circuit.

8. An optical transmitter in accordance with claim 1, wherein said light-emitting device comprises a light-emitting diode.

9. An optical transmitter in accordance with claim 1, wherein said high-pass filter provides an output signal which is gradually decreased relative to a level of said optical transmission input signal input to said high-pass filter, and when said predetermined time period has passed, the output signal of said high-pass filter has a level which is lower than said binarization threshold value of said binary circuit.

* * * * *